United States Patent [19]

Ripoche

[11] Patent Number: 5,402,144
[45] Date of Patent: Mar. 28, 1995

[54] ELECTRICAL SUPPLY FOR AN ELECTROCHROMIC CELL

[75] Inventor: Xavier Ripoche, Paris, France

[73] Assignee: Saint-Gobain Vitrage International, Courbevoie, France

[21] Appl. No.: 104,758

[22] Filed: Aug. 12, 1993

[30] Foreign Application Priority Data

Aug. 12, 1992 [FR] France ................. 92 09931

[51] Int. Cl.⁶ .............................................. G09G 3/34
[52] U.S. Cl. ..................................... 345/105; 359/265
[58] Field of Search .................... 345/55, 105, 106; 359/275, 265, 273

[56] References Cited

U.S. PATENT DOCUMENTS

| | | | |
|---|---|---|---|
| 4,529,873 | 7/1985 | Ballmer et al. | 359/275 |
| 5,073,011 | 12/1991 | Ito et al. | 359/265 |
| 5,124,833 | 6/1992 | Barton et al. | 359/275 |

FOREIGN PATENT DOCUMENTS 0291529  12/1990  Japan ...................... 345/105

OTHER PUBLICATIONS

Patent Abstracts of Japan vol. 014, No. 207 (P-1043) & JP-A-02 046 428 (Toyota Motor) Feb. 15, 1990.
Patent Abstracts of Japan vol. 012, No. 422 (P-783) & JP-A-63 157 132 (Hitachi Maxell) Jun. 30, 1988.

*Primary Examiner*—Alvin E. Oberley
*Assistant Examiner*—Chanh Nguyen
*Attorney, Agent, or Firm*—Oblon, Spivak, McClelland, Maier & Neustadt

[57] ABSTRACT

An electrochromic cell, connected to an electrical reference element equivalent to an element of the electrochromic cell of zero surface dimensions and zero electrolyte thickness, connected in series with a resistance $R_i$ identical to the ion resistance of the electrochromic cell (reduced to a same zero surface), a potential difference applied by a generator, in coloration and decoloration respectively, being such that the voltage at the terminals of the reference element is kept at a value below a coloration reference voltage or decoloration reference voltage respectively.

15 Claims, 4 Drawing Sheets

ELECTRICAL SUPPLY FOR AN ELECTROCHROMIC CELL

BACKGROUND OF THE INVENTION

1. Field of the Invention

The present invention relates to the electrical supply for an electrochromic cell, notably a pane with electrically controlled light transmission. The invention is applicable, notably, to all electrochromic cells of large dimensions intended, for example, for controlling the solar input in a building or in a passenger space of a vehicle.

2. Discussion of the Background

An electrochromic cell is constituted of a stack of layers comprising an electrochromic material, that is to say a material capable of inserting, in reversible manner, cations, notably protons or cations of alkali metals and having coloration states that vary between a colored state and a decolored state, an ion conducting electrolyte and a counter-electrode which serves as a reservoir for the cations and which, like the electrochromic material, must be capable of inserting and de-inserting the cations, symmetrically with respect to the film of electrochromic material. In the case of a system functioning in transmission, such as for example a pane, the counter-electrode must also be suitable for having a decolored state when the film of electrochromic material is itself in the decolored state. These conditions mean that in general pairs of cathodic and anodic electrochromic materials are chosen, with for example a cathodic material such as tungsten oxide $WO_3$ which becomes blue in color in the inserted state in association with an anodic material, such as iridium oxide $IrO_2$ or nickel oxide NiO, which is decolored in the inserted state.

The film of electrochromic material must, furthermore, be in contact with a transparent electrically conducting film. The same is true for the counter-electrode, although in this case the transparent character is necessary only for systems operating in transmission. The stack is sandwiched between two substrates, that on the electrochromic material side being of necessity transparent, such as for example glass plates.

In order to make the system operate it is necessary to apply, between any pair of facing points on opposite sides of the electrolyte, a potential difference at least equal to the difference in the thermodynamic potentials of the desired insertion/de-insertion reaction. In practice, taking account, notably, of the interface problems and of the resistance of the electrolyte, the minimum value to be applied is always slightly higher than the difference of the thermodynamic potentials. The greater the potential difference applied, the more rapid the coloration or decoloration. Nevertheless, the operating voltage should not be too high, because it is important not to exceed the voltages that permit parasitic reactions such as, for example, the release of hydrogen in the case of a proton system. For each change of coloration state of the electrochromic system, it is thus necessary not to exceed a certain potential difference, hereinafter termed the limiting potential of the system. To give some idea, in the case of a cell of the type $WO_3$/proton electrolyte/$IrO_2$, the limiting potential is +1.6 volts in coloration and −0.6 volts in decoloration (the signs conventionally adopted being (+) for the coloration voltage, (−) for the decoloration voltage; the limiting voltage should therefore be considered as an absolute value).

The electrically conducting films of the system are intended for the transfer of the charges, and the voltage only has to be applied between two diametrally opposite terminals of the electrochromic system. But it will be self-evident that the electrically conducting films of necessity have a certain resistance. Thus, in the case of a transparent film based upon indium oxide doped with tin (ITO), a square resistance of the order of 5 Ohms corresponds today to a conductivity optimum in industrial production conditions, and thus the ohmic drops of the system become greater as its dimensions increase. For this reason, the potential difference effectively applied between two facing points becomes smaller the further these points are from the terminals, and therefore for these points there is a very great delay in the coloration, the maximum coloration being obtained only after a period of several minutes. When the physical size of the system becomes large (for example of the order of a square meter), complete switching of the system may even prove impossible to achieve.

To overcome the problem of ohmic drops, the current leads are systematically made, not of point terminals, but of highly conducting strips or wires, for instance of copper, which extend along two opposite sides of the cell, so that all the points of a film equidistant from one of these sides are equipotential. Nevertheless, this is far from satisfactory once the width of the electrochromic system increases and exceeds, for example, 10 cm, a limit which is obviously incompatible with the production of a building pane or, for example, an opening roof for an automobile.

In European Patent Application EP-A-408 427, it has been shown that the switching speed of an electrochromic system is substantially improved if the potential difference applied is modulated during the switching period in such a way that the potential difference between a given point of the film of electrochromic material, chosen in immediate proximity to the electrical supply strip, and its facing point of the counter-electrode remains throughout this switching period lower than the limiting voltage at which parasitic reactions take place. This known method of supply leads to the application, at the start of a switching cycle, of a voltage which is much higher and it results in a speed of coloration or decoloration which is very substantially improved, for example six times higher for a pane width of 30 cm.

Nevertheless, for a width, for example, of one meter the switching times are still several minutes, at any rate if a satisfactory contrast is desired, for example of the order of 4, contrast being defined as the ratio of the light transmission in the decolored state to the light transmission in the colored state. Moreover, the supply process known from EP-A-408 427 has a tendency to accentuate greatly the contrast established at the start of switching between the edges of the pane and its central region. Ratios of more than 1 to 2 are commonly obtained, which corresponds to differences that are very easily perceived by the eye.

SUMMARY OF THE INVENTION

Accordingly, one object of the present invention is to provide a novel method of electrical supply for electrochromic systems which will make possible shorter switching times, while still guaranteeing the integrity of the system and, notably, the absence of parasitic reactions.

Another objective of the present invention is to reduce the contrast between the central region of an electrochromic system and its edges, notably at the start of switching when this contrast is most marked.

These problems are solved according to the present invention by connecting, in parallel with an electrochromic cell, an electrical reference element, equivalent to an element of the electrochromic cell of zero surface dimensions and zero electrolyte thickness, connected in series with a resistor $R_i$, equivalent to the ion resistance of the electrolyte of the electrochromic cell, reduced to a zero area, the voltage applied to the terminals of the cell for the coloration or decoloration being such that the voltage at the terminals of this reference element is maintained at a value less than a coloration reference voltage or decoloration reference voltage.

The present invention thus avoids the voltage drops in the electrically conducting films—due to the resistance $R_e$ of these films—and in the electrolyte—due to the ion resistance $R_i$—by connecting in parallel with the electrochromic cell an electrical element which would be equivalent to a cell of zero resistances $R_e$ and $R_i$, but without modifying the transfer impedance of the charges at the interfaces electrolyte/electrochromic material and electrolyte/counter-electrode. In other words, the equivalent electrical element is an electrochromic cell in which all the elements of the stack which surround the insertion and de-insertion films have a "perfect" behavior. By means of this reference element it is possible to compensate for the ohmic drops in the electrolyte and the electrically conducting films, thus making possible notably reduced switching times. Furthermore, since the ohmic drops in the electrolyte are compensated for, it becomes possible to use relatively bad electrolytes—or even very bad ion conductors—which leads to a greater surface homogeneity of the color during the coloration/decoloration phases.

In a first variant of one embodiment of the present invention, the equivalent electrical element is constituted of a very small electrochromic reference cell, for example of the order of 1 cm$^2$, with an electrolyte of negligible resistance compared with the ion resistance of the electrolyte of the principal electrochromic cell. It is thus possible to use a very small electrolyte thickness and/or for the cell to supply an electrolyte of the same nature but which is a less good ion conductor. In the case of an electrolyte of the ion conducting polymer type it will be possible, for example, to increase, for the reference cell, the quantity of charge carriers without modifying the basic matrix so as to retain the same conditions at the interfaces. In the case of a thin film electrolyte of the dielectric type, a film which is also thinner and has a greater porosity will be used.

It should be noted that, since this reference cell must necessarily be very small in order to avoid the ohmic drops due to the resistance in the electrically conducting films, it is possible to arrive at very limiting conditions which would be incompatible with deposition over a large area such as that of a pane, but which enable a very weak ion resistance to be achieved in the electrolyte. It is also possible to compensate for the ion resistance $R_i$ of the cell by taking into account the ion resistance $r_i$ of the reference cell, by connecting the reference cell in series with a resistor $R'$ such that $R'_i + r_i = R_i$, where $R_i$ in this case is the resistance of the electrolyte for an electrochromic cell of 1 cm$^2$ that is to say of the same dimensions as the reference cell. If $r_i$ is small compared with $R_i$, the compensation of the ohmic drop in the electrolyte will be almost total. With advantage again, the reference cell is kept systematically at a relatively high temperature, for example of the order of 60° C. because the ion resistance decreases with temperature, thus ensuring a small value of $r_i$. Moreover, if exactly the same materials are chosen as for the principal cell, an element will be obtained which has exactly the same impedances for transfer of charges and diffusion of ions. Moreover, if the reference electrochromic cell is placed in the same conditions of temperature as the principal cell, any variations that may occur in these impedances as a function of the temperature will be automatically compensated for.

In practice it may, however, be preferable to use an "entirely electric" reference element, a model of the reference cell which can be easily incorporated into the electrical supply circuit of the cell. Such an "entirely electric" reference element is composed of an electrical assembly—the impedance of which would be equivalent, for any frequency, to the impedance of a unit of area of the electrochromic cell—connected in series with a resistor $R_i$ corresponding to the ion resistance of an electrochromic cell of one unit of area.

In the following, the unit of area will always be chosen as 1 cm$^2$. But obviously any other dimension could be chosen, provided however that the unit of area remains small compared with the dimensions of the electrochromic cell to be supplied.

In so far as the electrochromic cells considered within the scope of the present invention are large and have coloration/decoloration times greater than about ten seconds, this electrical assembly may be reduced to a resistance R connected in series with a capacitance C. As will be demonstrated later, to a first approximation C may be considered as equivalent to the ratio of the quantity of charges inserted into the electrochromic material to the equilibrium potential of the cell, that is to say the potential measured after a homogenization time long enough to allow a uniform distribution of the ions through the thickness of the electrochromic material. The resistance R corresponds, for its part, to the sum of the transfer resistance $R_t$ for charges at the interfaces with the electrolyte and of a resistance $R_D$ due to the diffusion of the ions through the cell.

It should be noted that the values of $R_T$, $R_D$, $R_i$ and C depend solely upon the nature and thickness of the different layers of the material. The same is true for $R_e$, the square resistance of the electrically conducting films. Or in other words, the reference element and the resistance $R_i$ which is associated with it are completely independent of the size of the system, which enables a single supply to be used (provided however that this supply is capable of providing the power necessary which, in turn, increases with the size of the electrochromic cell).

It can be shown that the uniformity of the color right at the start of coloration or decoloration depends upon the ratio $R_T + R_D + R_i/R_e$. If the homogeneity is defined from the ratio of the initial effective voltages at zero time at the center and at the edges of the cell by current supply leads, it has been found that a homogeneity higher than 70% is achieved when this ratio exceeds 1000. The coloration homogeneity is of the order of 95% for a ratio of 10,000. Since the transfer and diffusion resistances are limiting to the coloration speed in the process according to this invention, it is nevertheless important not to increase the term $R_T+R_D$. On the contrary, it is advantageous to use electrically conducting films of very low resistivity. Moreover, the electrolyte is preferably chosen with a high ion resistance, preferably equal to at least 500 times the square resistance of the electrically conducting films, preferably without exceeding 100,000 times this value, because then the power that must be supplied to the pane becomes very large.

In order to increase the ion resistance of the electrolyte, it is possible, as indicated above, to modulate its thickness and/or its quantity of charge carriers (in the case of an ion-conducting polymer electrolyte), or its porosity (in the case of a dielectric). It is also possible to place the electrolyte between two highly resistant barrier layers such as, for example, films of dielectrics of the type $Ta_2O_5$ having very low porosities, the ion resistance of the assembly composed of the electrolyte and the two barrier films being preferably between 10,000 and 100,000 Ohms. Higher values demand excessively high supply voltages. On the other hand, even though the ion resistance may with advantage be very high, the electrolyte must certainly have a certain conductivity to enable the thermodynamic equilibriums to be established. Preferably again, the ion conductivity of the electrolyte in this stack comprising barrier film is chosen higher than $10^{-3}$ Ohm$^{-1}$.

To allow for the decrease in the ion resistance of the electrolyte as the temperature rises, it is preferable to use, for the resistors $R_i$, thermistors or equivalent electronic assemblies, the resistance of which varies with temperature as does the resistance of the electrolyte. Thermistors can also be used for the resistances $R_T$ and $R_D$ but the temperature factor is less critical and furthermore $R_T+R_D$ is small compared to $R_i$, and there is therefore less justification for the use of thermistors. In the operating temperature range of the electrochromic cells, the capacitance C does not appear to depend upon temperature.

It is noted above that the simplified impedance model is valid for relatively long switching times. In practice, it leads to minimizing the potential difference applied to the cell right at the start of switching, or in other words to fix a ceiling for the current and thus the initial coloration or decoloration speed. To overcome this it is possible to use, as indicated above, an electric assembly reproducing, for each frequency, the impedance of the cell, or a semi-simplified assembly comprising, in addition to the resistance R and capacitance C, a capacitance C' connected in parallel to capacitance C.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
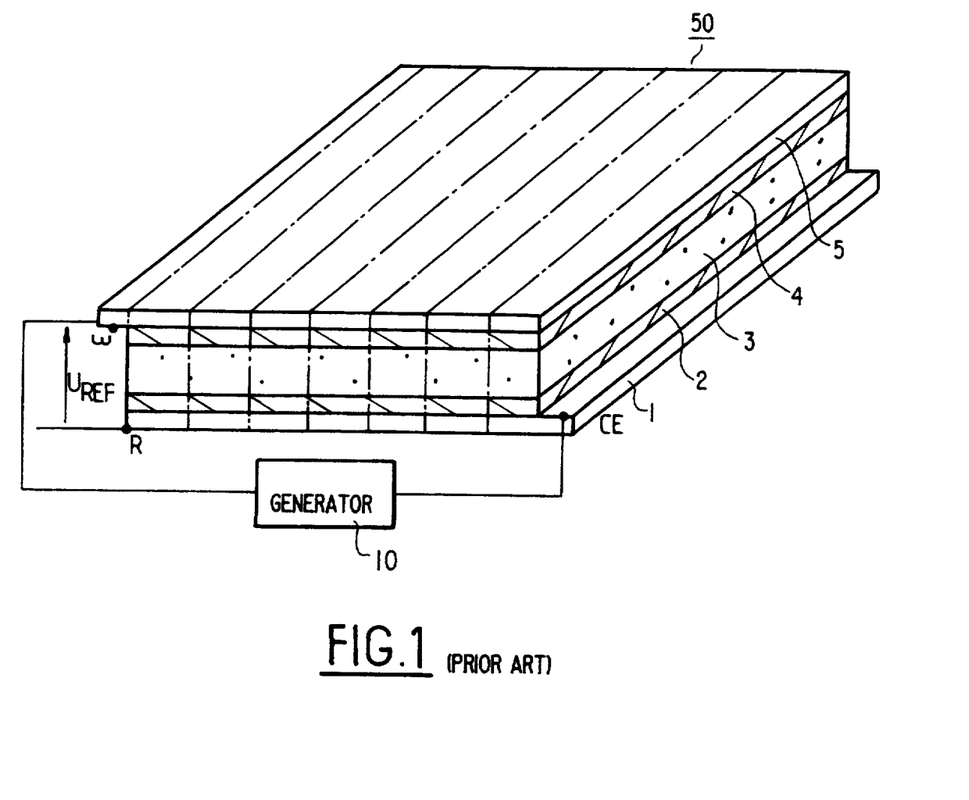
FIG. 1 is a basic diagram of an electrochromic cell according to European Patent Application EP-A-408 427.

Referring now to the drawings, wherein like reference numerals designate identical or corresponding parts throughout the several views, and more particularly to FIG. 1 thereof, in which, for simplicity, we shall limit ourselves in the remainder of this specification to an electrochromic cell 50 composed of the stack of the following layers shown in FIG. 1 of an electrically conducting film 1 based upon indium oxide (ITO) deposited, for example, by magnetron cathodic sputtering, a cathodic electrochromic material 2 ($WO_3$), a proton-conducting electrolyte 3, a counter-electrode 4, an anodic electrochromic material $IrO_2$, charged with protons before assembly, and an electrically conducting film 5 identical to (1).

The thermodynamic equilibriums which enter into the coloration/decoloration reactions may be written as follows:

$$\begin{array}{ll} WO_3 + & H^+ + e^- \ H\ WO_3 \\ \text{colorless} & \text{blue} \\ H^+IrO_2\quad H^+ & + e^- + IrO_2 \\ & \text{grey} \end{array}$$

To avoid parasitic reactions, notably the formation of hydrogen, at 20° C., the limiting potential differences are 1.6 V in coloration and $-0.6$ V in decoloration. But it should be noted that these limiting voltages correspond to the local potential differences between a point situated on the $WO_3$ side and opposite it on the $IrO_2$ side. The potential difference applied to the cell may, in fact, be very much higher provided that at any pair of facing points the limiting voltage is not exceeded.

In the following, we shall limit ourselves to the case of coloration, but it will be self-evident that what is said here applies equally well to the decoloration phases, using the appropriate limiting voltages.

In the case of the electrical supply proposed by Patent Application EP-A408 427, a potential difference is applied by the generator 10 across the metallic or melanized strips (terminals W and CE) such that the potential difference $U_{REF}$, between the terminal W and the facing terminal R of the $IrO_2$ film, shall be kept lower than the limiting voltage of 1.6 V throughout the entire duration of a coloration. This amounts to applying, at the start of coloration, a relatively high potential difference which will decrease according to an exponential curve during the course of the coloration. The gaining time is very great by comparison with a supply at constant voltage, but nevertheless coloration times greater than two minutes (for a contrast of 4) are still necessary, with electrically conducting films having a square resistance of 5 Ohms.

Figure 2:
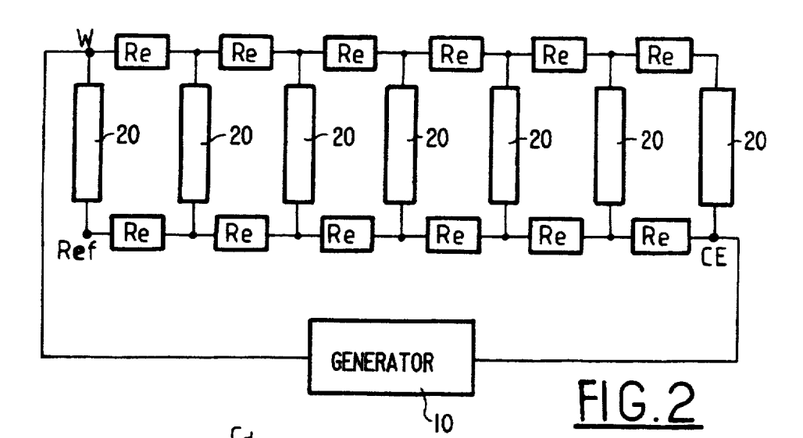
FIG. 2 is a model representation of the electrochromic cell of FIG. 1, represented by a 7-path grid.

To obtain a better understanding of the phenomena limiting the reaction kinetics, an electric modelling of the electrochromic cell was carried out. To do this, the electrochromic cell is meshed into N strips parallel to the lateral feeder strips. In FIG. 1, seven strips have thus been shown. If these strips are fairly numerous, and therefore each correspond to a very small spacing by comparison with the distance between the current supply strips, it can be assumed that in each of these strips the potential drop due to the ITO is negligible, and therefore that the electrochromic cell can be represented by the electrical grid of FIG. 2, that is to say by an assembly of 7 small cell elements 20 connected two by two by two resistors $R_e$. In practice, a good correlation with the real values measured by cells of at most 1 m width is found from a mesh in which N=41.

Figure 3:
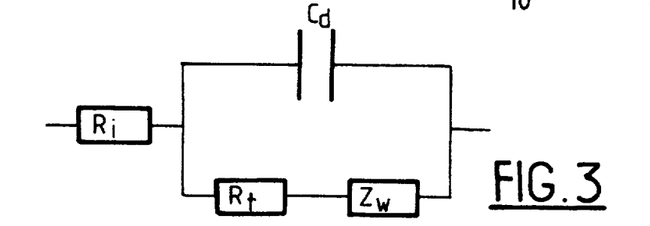
FIG. 3 is a basic diagram of an electrical circuit equivalent to an interface of the electrolyte/electrochromic material type.

Each of these elements can, from the electrical aspect, be represented by its electric circuit of the type known as Randles circuit as shown in FIG. 3, and as described in the article by C. HO, I. D. RAISTRICK and R. A. HUGGINS, appearing in the "Journal of the Electrochemical Society"—No. 127—page 343—(1980). In this circuit, $R_i$ represents the ion resistance of the electrolyte, $R_t$ the charge transfer resistance at the interfaces $WO_3$/electrolyte and electrolyte/$IrO_2$, $C_d$ the capacitance of the double film at these interfaces and $Z_w$ the Warburg impedance of the cell taking into account the diffusion of the ion species in $WO_3$ and $IrO_2$.

The impedance Z of this electrical model can be simplified in two limiting cases. At time=0, if a voltage $V_o$ is applied, the measured current intensity tends towards $V_o/R_i$, and measuring the current $I_o$ therefore enables the value of $R_i$ to be accessed.

In addition, at low frequency (W<0.1 Hz), the double film capacitance $C_d$ becomes negligible and the diffusion impedance is reduced to a diffusion resistance in series with a capacitance C. The impedance Z can then be written $Z=R_i+R_t+R_d-j/Cw$.

Figures 4, 6:
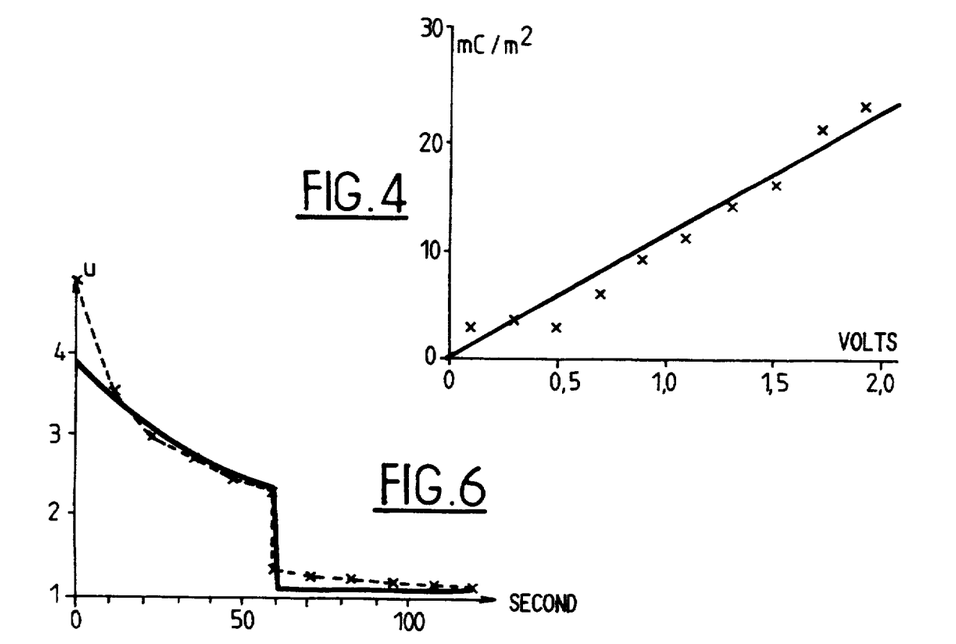
FIG. 4 is a curve showing the quantity of charge inserted (in millicoulombs per square centimeter as a function of the exit potential of the cell)
FIG. 6 is a curve showing the potential difference applied, plotted against time, for a real cell in accordance with FIG. 1 or according to the model of FIG. 5.

The capacitance C of the electrochromic cell may be calculated from the curve of FIG. 4, where the quantity of charges inserted into $WO_3$ is plotted as the ordinate and on the abscissa the exit potential of the cell is plotted, that is to say the equilibrium potential of the cell measured when the electrical supply is cut off, after a homogenization time of several minutes sufficient to avoid problems of ion diffusion. As can be seen from FIG. 4, the equilibrium potential increases approximately linearly with the quantity of charges inserted according to a relationship of the type Q=CV, which, in the case of the stack under consideration, enables a capacitance value of 9.9 mF/cm² to be obtained.

The precise values of $R_D$ and $R_T$ depend upon the state of coloration of the cell. The resistance value $R_e$ being moreover known, the value of $R=R_D+R_T+R_i$ can be adjusted so that the impedance $Z=R-J/G_w$ corresponds to the experimental value. We have therefore established, for different values of R, the curve illustrated in FIG. 6, giving the coloration voltage as a function of time, an the one hand for an experimental cell (dotted curve) and on the other hand for different values of R, in the electrical model shown in FIG. 5 (but by choosing a mesh parameter N=41), until a satisfactory value for R is obtained by successive approximation. The curve in full lines in FIG. 6 has thus been obtained by choosing R=3400 Ohms, which enables us to approximate for $R_T+R_D$ the value of 2400 Ohms, it being known that the ion resistance calculated from the measurement of current intensity $I_o$ and the applied voltage $V_o$ is of the order of 1000 Ohms.

It is thus possible to obtain good modelling of the system over long periods by knowing to a good approximation the values of $R_i$, $R_T+R_D$, $R_e$ and C. As can also be seen from FIG. 6, this simple model is not valid for the first 10 seconds of coloration (it has been approximated for low frequencies). For this period it is necessary to make the model more complex, for example by adding a capacitance C', connected in parallel After 10 seconds, however, the electrochromic cell can certainly be modelled by diagrams such as that of FIG. 6, the voltage between the terminal W and the reference terminal being kept, for example, less than or equal to the limiting coloration voltage by means of a differential amplifier having a very high gain, for example of the order of $G=10^6$.

Figure 5:
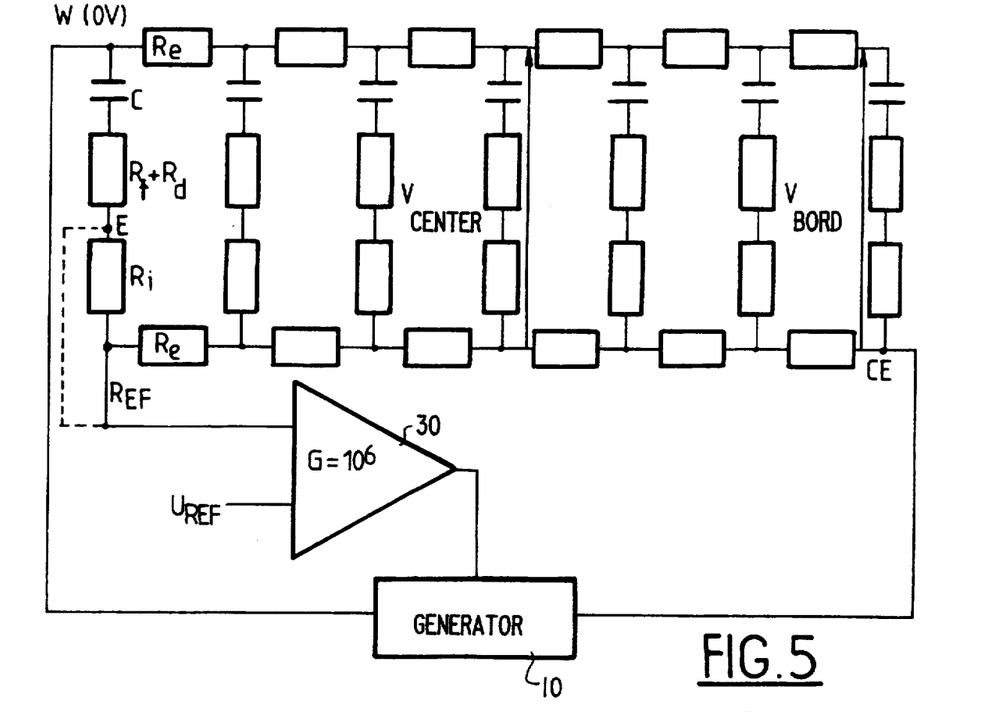
FIG. 5 is a model of an electric circuit equivalent to the electrochromic cell of FIG. 1.

If the reference electrode is placed, not between $R_e$ and $R_i$ as in the case of the assembly described in European Patent Application EP-A-408 427, but as indicated by the dotted line at E in FIG. 5 and therefore between $(R_T+R_D)$ and $R_i$, it will be possible to compensate for the voltage drop in the electrolyte. This output at point E is then input into amplifier 30 having a gain of G. In this way, the supply voltage applied to the system between the terminals W and CE for maintaining a reference voltage of 1.6 volts will need to be increased, with the consequence of shorter coloration times. The greater the ion resistance of the electrolyte, the greater will be the saving in coloration time. Nevertheless, account must be taken also of the admissible supply voltages for the application of the electrochromic cell (in an automobile it is, for example, preferable to restrict the supply voltage to a maximum of 12 volts, whereas for a pane in a building a limit of 110 or 220 volts may be chosen). Furthermore, the increase in the ion resistance $R_i$ implies an increase in the power dissipated and losses by Joule effect. In practice, a compromise must therefore be used between the desired coloration time and the characteristics of the electrical supply.

Figure 8:
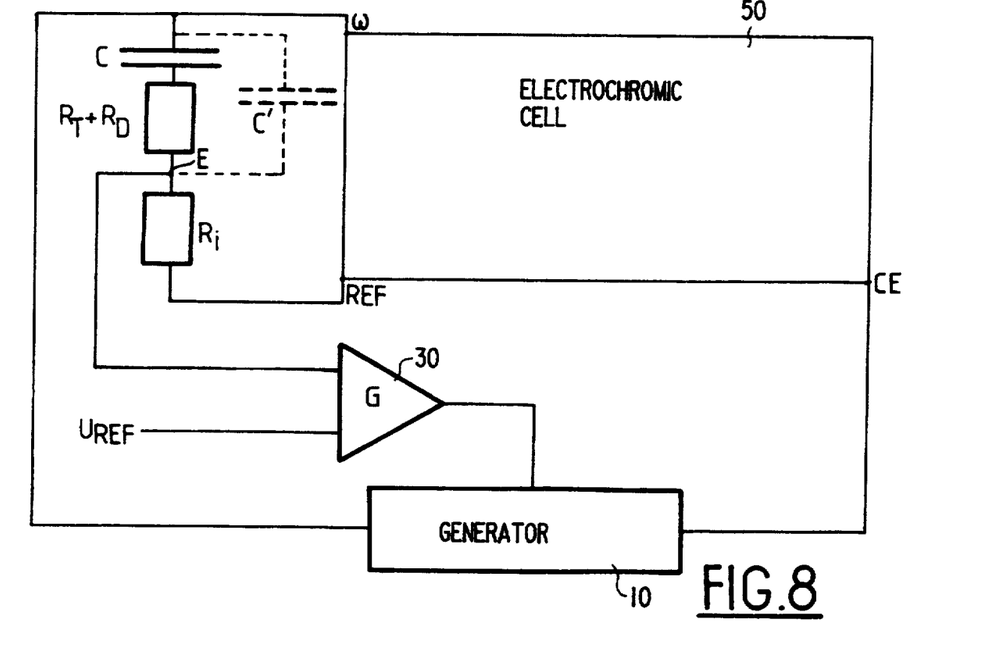
FIG. 8 is a model of a cell comprising a reference element according to this invention.

In practice, it will he obvious that the reference electrode cannot be placed between $(R_T+R_D)$ and $R_i$ as in the case of FIG. 5. It is, however, possible to add a supplementary "link" to the grid in the form of a small electrochromic cell or an electrical reference element which, as indicated in the assembly shown schematically in FIG. 8, is connected in parallel with the cell. It should be noted that, in the case where the reference element is constituted of an electrochromic cell of small dimensions, account must be taken of the ion resistance $r_i$ of the reference cell, and in that case a resistance $R'_i$ is used such that $R'_i=R_i+r_i$.

The reference element, at the terminals of which the reference voltage is monitored, is thus simply composed of a capacitance C and a resistance $(R_T+R_D)$, the values of the components C, $(R_T+R_D)$ and $R_i$ being determined for each type of electrochromic stack by the modelling program and the characteristic voltage and current curves for the electrochromic cell. In order to accelerate the coloration kinetic in the short term, it is advantageous to add a capacitance C' in parallel with C and $(R_T+R_D)$, which enables the variation in impedance at the start of coloration to be taken into account, as shown in the dashed lines in FIG. 8.

Figure 7:
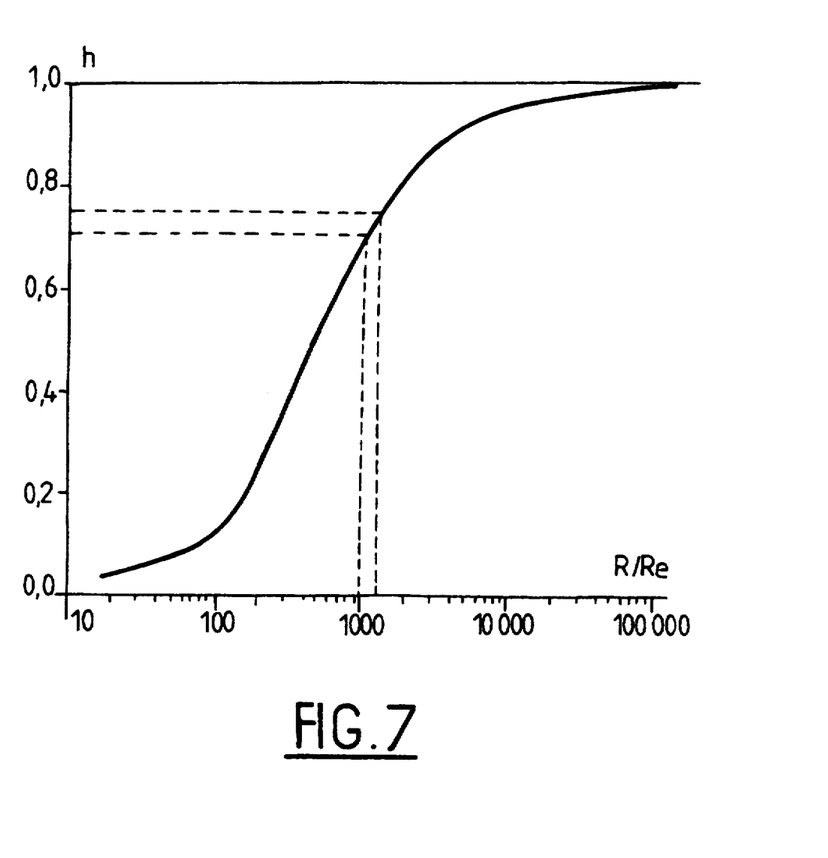
FIG. 7 is a curve showing the homogeneity factor of the pane as a function of the ratio $R_D+R_T+R_i/R_e$.

Furthermore, the electrical reference model has made it possible to calculate the coloration homogeneity factor h (h being defined as the ratio of the voltage at the center of the cell to the voltage at the edges near the supply terminals) as a function of the value of the ratio $R/R_e$, where $R=R_T+R_D+R_i$. The curve representing h is given in FIG. 7, a logarithmic scale being used for the ratio $R/R_e$.

Quite evidently, it is advantageous to reduce $R_e$, but we have already indicated that this reduction will very rapidly encounter technical and physical difficulties which forbid the use of films that are both highly electrically conducting and highly transparent. In fact, it is difficult to vary the ratio $R/R_e$ by more than a factor of 3 by acting on the value of $R_e$. In contrast, the ion resistance of the electrolyte can be increased, for example, by decreasing the number of charge carriers in the polymer, by changing the thickness of the electrolyte or again by using highly resistant barrier films (but which are still ion-conducting), for example based upon tantalum oxide. Another possibility is to add, at the interface electrically conducting film/electrochromic material film and/or at the interface electrically conducting film/counter-electrode, an additional transparent film, which has a low but non-zero electron conductivity Ce and an ion conductivity Ci which is as small as possible (the ratio Ci/Ce being very high).

The comparison between this invention and an assembly in accordance with the state of the art, but with a compensation of the resistance $R_e$ of the electrically conducting films, has been made for two types of panes, an electrochromic roof in which the coloration area has the dimensions 40 cm×74 cm and a building pane having effective dimensions 100 cm×200 cm, the simulations having been made by, adopting the following respective values: $R_T+R_D=2400$ Ohms and C=10 $mF/cm^2$ determined experimentally As the attached tables show, the process according to the present invention enables a very high uniformity of coloration and a particularly remarkable saving in coloration time to be obtained in the case of a building pane.

With a simple modification to the supply circuit, the compensation of the ion resistance of the electrolyte allows, however, only fairly small savings. In contrast, if the value of $R_i$ is increased, the savings become very appreciable, switching gains of 25 seconds (or 40 seconds) being achieved in the case of the building pane, for a contrast of 3 (or 4 respectively), with a homogeneity of more than 95%. Without compensation of the ion resistance, it will be noted that the increase in the ion resistance at the same time enables a much greater uniformity of coloration to be achieved, but at the cost of a very large increase in the coloration times which, for an opening roof, are already as much as two minutes for a contrast of only 2.

| | Opening Roof - $R_e$ = 10 Ohms | | | | |
|---|---|---|---|---|---|
| | Supply according to EP 0 408 427 | | Supply according to the invention | | |
| $R_i$ (Ohms) | 1,000 | 10,000 | 1,000 | 10,000 | 100,000 |
| h | 0.41 | 0.75 | 0.48 | 0.75 | 0.96 |
| Vo (Volt) | 3.9 | 2.5 | 4.6 | 12.8 | 73.5 |
| Po (Watt) | 3.4 | 0.8 | 4.3 | 22 | 144 |
| C = 3 Time (seconds) | 56 | 140 | 63 | 30 | 23 |
| Energy (Joule) | 95 | 65 | 105 | 260 | 1500 |
| C = 4 Time (seconds) | 90 | 215 | 84 | 50 | 40 |
| Energy (Joule) | 110 | 79 | 122 | 300 | 1700 |

| | Opening Roof - $R_e$ = 5 Ohms | | | | |
|---|---|---|---|---|---|
| | Supply according to EP 0 408 427 | | Supply according to the invention | | |
| $R_i$ (Ohms) | 1,000 | 10,000 | 1,000 | 10,000 | 100,000 |
| h | 0.6 | 0.86 | 0.67 | 0.86 | 0.98 |
| Vo (Volt) | 3.0 | 2.1 | 3.6 | 10.7 | 70 |
| Po (Watt) | 3.2 | 0.74 | 4.0 | 20 | 140 |
| C = 3 Time (seconds) | 45 | 130 | 42 | 26 | 23 |
| Energy (Joule) | 80 | 58 | 86 | 225 | 1500 |
| C = 4 Time (seconds) | 70 | 200 | 66 | 42 | 40 |
| Energy (Joule) | 93 | 70.7 | 102 | 250 | 1600 |

| | Building Pane - $R_e$ = 50 Ohms | | |
|---|---|---|---|
| | Supply according to EP 0 408 427 | Supply according to the invention | |
| $R_i$ (Ohms) | 1,000 | 10,000 | 100,000 |
| h | 0.4 | 0.26 | 0.8 |
| Vo (Volt) | 8.3 | 25 | 100 |
| Po (Watt) | 22 | 170 | 1140 |
| C = 3 Time (seconds) | 170 | 110 | 30 |
| Energy (Joule) | 1040 | 2500 | 12800 |
| C = 4 Time (seconds) | 290 | 270 | 50 |
| Energy (Joule) | 1200 | 2600 | 13800 |

| | Building Pane - $R_e$ = 5 Ohms | | |
|---|---|---|---|
| | Supply according to EP 0 408 427 | Supply according to the invention | |
| $R_i$ (Ohms) | 1,000 | 10,000 | 100,000 |
| h | 0.13 | 0.46 | 0.89 |
| Vo (Volt) | 6.2 | 19 | 83 |
| Po (Watt) | 23 | 164 | 1000 |
| C = 3 Time (seconds) | 100 | 55 | 25 |
| Energy (Joule) | 900 | 2300 | 12000 |
| C = 4 Time (seconds) | 170 | 130 | 40 |

| -continued | | | |
|---|---|---|---|
| Energy (Joule) | 1018 | 2400 | 12400 |

What is claimed as new and desired to be secured by Letters Patent of the United States is:

1. An electrochromic cell system comprising:
    a principal electrochromic cell;
    an electrical reference element, connected in parallel with the principal electrochromic cell;
    a resistance $R_i$, connected in series with the electrical reference element; and
    a generator for applying a potential difference to the principal electrochromic cell in coloration and in decoloration, respectively, such that a voltage at terminals of the electrical reference element is kept at a value lower than the coloration reference value or decoloration reference value respectively;
    wherein said electrical reference element comprises a second electrochromic cell, for which ohmic drops resulting from electrically conducting films and from an ion resistance of an electrolyte are less than those of the principal electrochromic cell; and
    wherein said electrical reference element comprises an electrolyte, of which a transfer resistance $R_T$, for ions at its interfaces is identical to that of an electrolyte of the principal electrochromic cell and of which an ion resistance is less than an ion resistance of the electrolyte of the principal electrochromic cell, measured for a cell of the same dimensions as those of the electrical reference element.

2. The electromagnetic cell system according to claim 1, wherein the electrochromic reference cell is subject to a same temperature as a remainder of the cell.

3. The electrochromic cell system according to claim 1, wherein the electrochromic reference cell is kept at a high temperature, of the order of 60° C.

4. The electrochromic cell system comprising:
    a principal electrochromic cell;
    an electrical reference element, connected in parallel with the principal electrochromic cell;
    a resistance $R_i$, connected in series with the electrical reference element;
    a generator for applying a potential difference to the principal electrochromic cell in coloration and in decoloration, respectively, such that a voltage at terminals of the electrical reference element is kept at a value lower than the coloration reference value or decoloration reference value respectively;
    wherein the principal electrochromic cell is formed by stacking, onto a transparent substrate, a system comprising a transparent electrically conducting film, a film of electrochromic material, an electrolyte, a counter-electrode, an electrically conducting film and a substrate, the voltage generator enabling a potential difference to be applied between the film of electrochromic material and the counter-electrode for obtaining the coloration or the decoloration respectively of the principal electrochromic cell, wherein said electrical reference element comprises an electrical assembly, a complex impedance of which is equivalent to a complex impedance Z of a unit of area of the principal electrochromic cell minus an ionic resistance of a corresponding electrolyte of the principal electrochromic cell, and is connected in series with a second resistance corresponding to an ion resistance of an electrochromic cell of one unit of area.

5. The electrochromic cell system according to claim 4, wherein a resistance R and a capacitance C are substituted for the complex impedance Z, C being equal to a ratio of a quantity of charges inserted into the electrochromic material to the equilibrium potential of the cell.

6. The electrochromic cell system according to claim 5, wherein the electrically conducting films have a square resistance $R_e$ such that a ratio $R+R_i/R_e$ is greater than 1,000 ohms-square for a cell of one unit of area.

7. The electrochromic cell system according to claim 6, wherein the resistance $R_i$ and the resistance $R_e$ are chosen such that the ratio $R_i/R_e$ is greater than 500 ohms-square for a cell of one unit of area.

8. The electrochromic cell system according to claim 7, wherein the ratio $R_i/R_e$ is less than 100,000 ohm-square.

9. The electrochromic cell system according to any one of claims 6 to 10, wherein that the electrolyte is placed between two barrier films having high resistivity, such that the ion resistance of the assembly constituted of the electrolyte and the two barrier films is greater than 10,000 Ohms and less than 100,000 Ohms.

10. The electrochromic cell system according to claim 9, wherein the electrolyte has an ion conductivity greater than $10^{-1}$ Ohms$^{-1}$.

11. The electrochromic cell system according claim 1, wherein the resistance $R_i$ is provided by a thermistor, a resistance of which varies as a function of temperature.

12. The electrochromic cell system according to claim 1, further comprising a capacitance C' connected in parallel with the electrical reference element.

13. The electrochromic cell system according to claim 1, wherein the reference voltage is chosen identical to a limiting coloration/decoloration voltage.

14. The electrochromic cell system according to claim 1, wherein the reference voltage is chosen equal to a limiting coloration/decoloration voltage except at an end of coloration or decoloration, where the reference voltage is increased.

15. The electrochromic cell system according to claim 4, further comprising, at the interface electrochromic material/transparent electrically conducting film and/or at the interface counter-electrode/transparent electrically conducting film, an additional transparent film, which has a low but non-zero electron conductivity Ce and an ion conductivity Ci which is as small as possible (the ratio Ci/Ce being very large).

* * * * *